United States Patent [19]

Speckhart

[11] Patent Number: 5,533,422
[45] Date of Patent: Jul. 9, 1996

[54] SYSTEM FOR ABSORBING TORSIONAL AND/OR BENDING VIBRATIONS

[76] Inventor: Frank H. Speckhart, 3411 Kingston Pike, Knoxville, Tenn. 37919

[21] Appl. No.: 345,935

[22] Filed: Nov. 28, 1994

[51] Int. Cl.$^6$ ............................................. F16F 15/14
[52] U.S. Cl. ............................................. 74/573 R; 74/574
[58] Field of Search .................................. 74/574, 573 R

[56] References Cited

U.S. PATENT DOCUMENTS

| | | | |
|---|---|---|---|
| 2,659,243 | 11/1953 | Darrieus | 74/573 R |
| 4,458,554 | 7/1984 | Hrastar | 74/573 R |
| 5,295,411 | 3/1994 | Speckhart | 74/574 |

*Primary Examiner*—Rodney H. Bonck
*Assistant Examiner*—MaryAnn Battista
*Attorney, Agent, or Firm*—Michael E. McKee

[57] ABSTRACT

A system for absorbing bending vibration in a shaft which is drivingly rotated about an axis and wherein the shaft is exposed to bending disturbances utilizes a body attachable to the shaft for rotating therewith as the shaft rotates about its axis of rotation and round roller elements positioned within the cavities disposed in the body. During operation of the system, the bending disturbances induce pendulum-like motion of the roller elements within the cavities in a manner which absorbs bending vibration of the shaft. The roller elements, the cavities and the bending disturbances are related to one another in accordance with an equation which optimizes performance of the system and circumvents time-consuming trial and error techniques during design of the system. In the event that the cavities have spherical walls and the roller elements are spherical in form, the system is capable of absorbing torsional, as well as bending, vibrations in a rotating shaft.

22 Claims, 4 Drawing Sheets

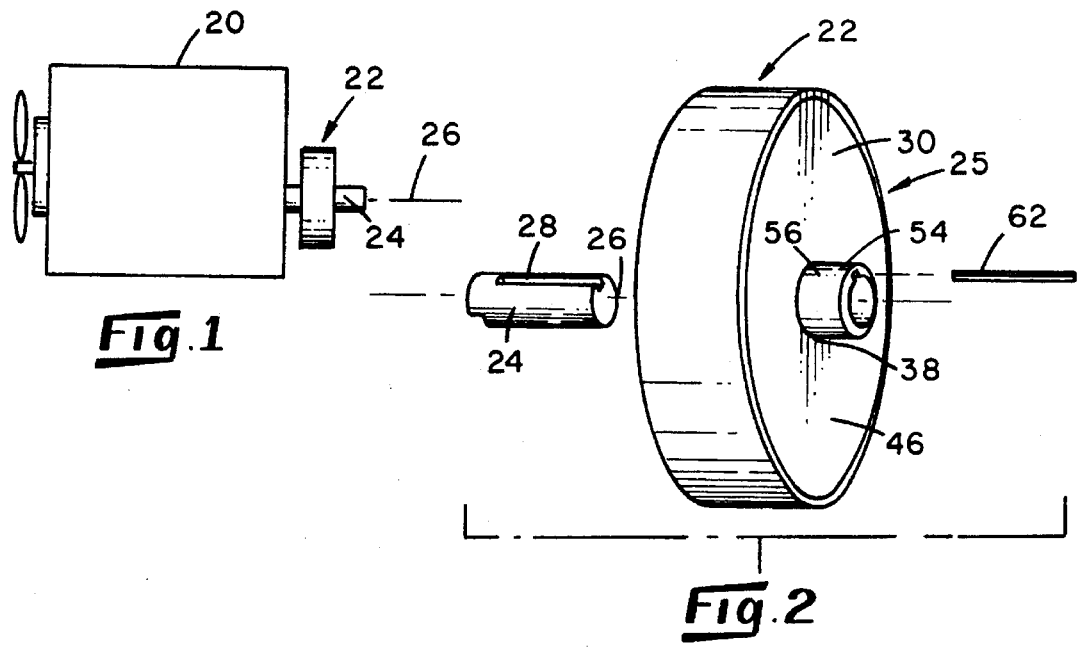
Fig. 1
Fig. 2
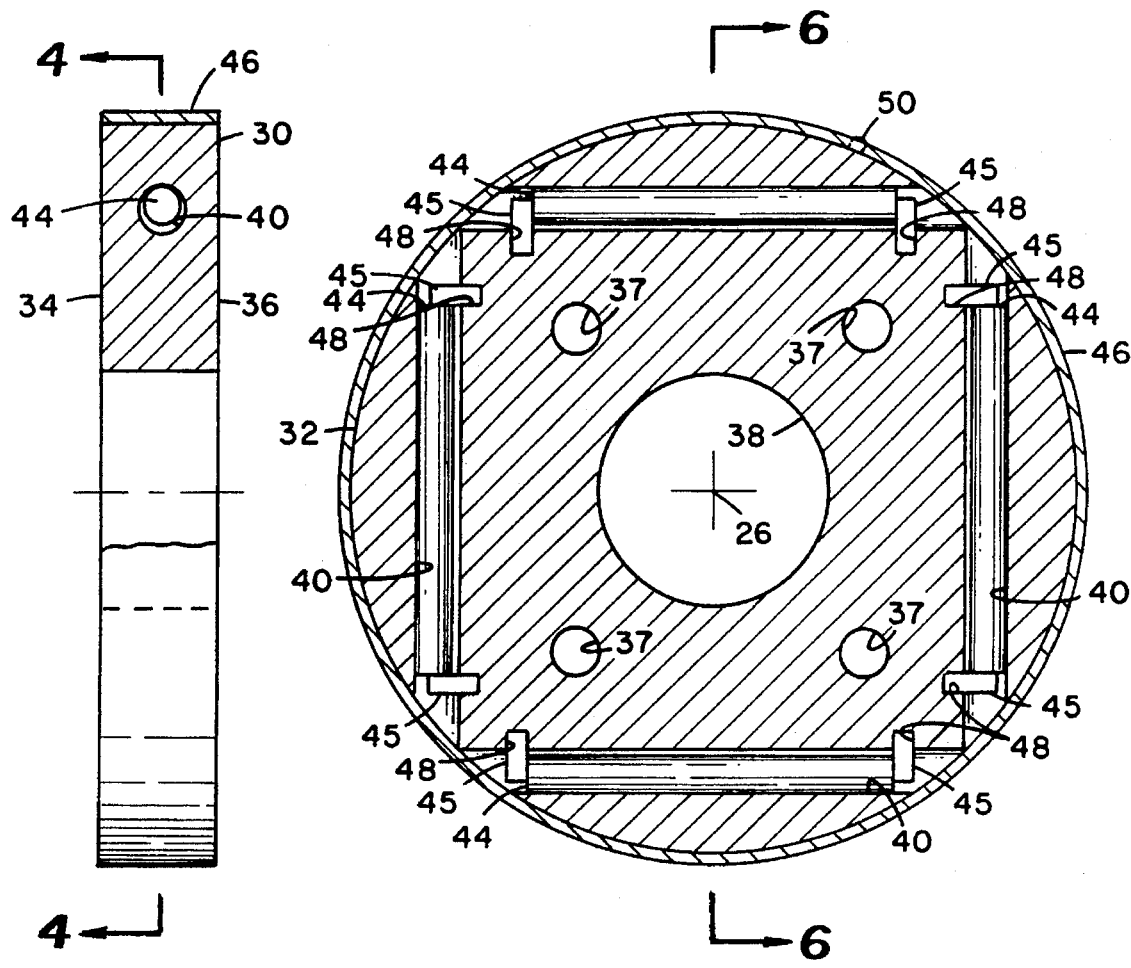
Fig. 3
Fig. 4

5,533,422

1

SYSTEM FOR ABSORBING TORSIONAL AND/OR BENDING VIBRATIONS

BACKGROUND OF THE INVENTION

This invention relates generally to vibration absorbers and relates, more particularly, to means for absorbing vibrations, such as bending and torsional vibrations, in a rotating shaft and for reducing speed variations in a rotating shaft.

Shafts which are drivingly rotated commonly experience disturbances during rotation, and these disturbances induce bending and torsional vibrations in the shaft. In an internal combustion engine, for example, the engine crankshaft is exposed to cyclic disturbances in the form of power pulses which tend to excite the crankshaft in both a bending and torsional manner. As another example, in a multi-blade grinding apparatus having rotating blades which are driven by a drive shaft, the drive shaft is exposed to cyclic disturbances which can generate bending and torsional vibrations.

The vibration-inducing disturbances with which this invention is concerned include those which are substantially evenly or regularly-spaced throughout rotation of the shaft. In a multi-cylinder internal combustion engine, for example, these torsional disturbances are a consequence of equally-spaced power pulses generated within the engine cylinders. For example, in an eight-cylinder, four-cycle engine, there are generated four equally-spaced power pulses, and thus four regularly-spaced disturbances for each revolution of the crankshaft. In a multi-blade grinding apparatus, e.g., a tree chopper, having shaft-driven blades which engage objects being ground at a predetermined number of equally-spaced intervals during a single revolution of the driving shaft, there are produced an equal number of regularly-spaced disturbances for each revolution of the shaft. Thus, this invention can be applied to the drivingly-rotated shaft of any internal combustion engine, e.g. a two or four cycle, diesel or spark-ignited, or machine within which are generated evenly-spaced powered strokes or disturbances.

With regard to engine-driven shafts, it is known that vibrations, i.e. torsional vibrations, induced in rotating shafts can be controlled, to a degree, with vibration absorber devices intended to oppose the forces which excite, and thus absorb, the vibrations. The operating principles of a vibration absorber are in contrast to those of a vibration damper which is intended to dissipate energy of the vibrations.

The named inventor of the instant application has described one torsional vibration absorbing system in his U.S. Pat. No. 5,295,411 as including a body attachable to a rotating shaft for rotation therewith and cylindrical rolling elements positioned within cavities disposed within the body. During operation of the system, the torsional disturbances induce pendulum-like motion of the cylindrical elements within the cavities in a manner which absorbs torsional vibration of the shaft. The cylindrical elements, the cavities and the torsional disturbances are related to one another in accordance with an equation which optimizes performance of the system and circumvents time-consuming trial and error techniques during design of the system. While the system of the referenced patent is effective for its intended purpose, it is limited to the absorbing of torsional vibrations, rather than bonding vibrations.

It is an object of the present invention to provide a new and improved system for absorbing vibrations, such as bending and torsional vibrations, in a rotating shaft exposed to disturbances of the aforedescribed class and for decreasing the bending and torsional stresses in, for increasing the stiffness of, and for reducing the noise of such a rotating shaft.

Another object of the present invention is to provide such a system which absorbs bending and/or torsional vibrations and reduces speed variations in a rotating shaft at all shaft speeds.

Still another object of the present invention is to provide such a system whose design can be optimized without the need for time-consuming trial and error techniques.

Yet another object of the present invention is to provide such a system which is uncomplicated in construction and effective in operation.

SUMMARY OF THE INVENTION

This invention resides in a system for absorbing bending and/or torsional vibration in a shaft which is drivingly rotated about an axis and wherein the shaft is exposed to bending disturbances which tend to cyclically bend the shaft or to torsional disturbances which tend to alternately increase and decrease the rotational speed of the shaft and wherein the bending or torsional disturbances are regularly spaced throughout each revolution of the shaft.

In one embodiment of the system, the system includes means defining at least one elongated cavity for rotating with a rotating shaft as the shaft rotates about its axis of rotation, and the elongated cavity is arranged in such a relation to the shaft so that the longitudinal axis of the cavity is arranged in a plane oriented substantially perpendicular to the axis of shaft rotation. The system also includes a rolling element positioned within the cavity so as to be free to roll along the interior wall of the cavity in a pendulum action in response to the bending disturbances during shaft rotation. Each rolling element is related to the elongated cavity and to the bending disturbances desired to be absorbed by the system in accordance with the equation:

$$N^2 = r_w^2 r_3 / [(r_g^2 + r_w^2)(r_1 - r_w)]$$

wherein N is within about ±15% of the number of the bending disturbances per revolution, $r_w$ is the radius of the rolling element about its longitudinal axis, $r_g$ is the radius of gyration of the rolling element about its longitudinal axis and through its mass center, $r_1$ is the radius of the cavity, and $r_3$ is the radial distance of the center of the cavity from the axis of rotation of the shaft.

In another embodiment of the system, the cavity of the cavity-defining means has spherical walls, and the rolling element is spherical in form and is positioned within the cavity so as to be free to roll along the interior wall of the cavity in a pendulum action in response to either the torsional disturbances or the bending disturbances desired to be absorbed. In addition, the rolling element is related to its cavity and to the bending or torsional disturbances desired to be absorbed by the system in accordance with the foregoing equation wherein, in this embodiment, N is within about ±15% of the number of the bending or torsional disturbances per revolution.

BRIEF DESCRIPTION OF THE DRAWINGS

FIG. 1 is an elevational view illustrating schematically an internal combustion engine utilizing a vibration absorber embodying features of the present invention.

FIG. 2 is a perspective view of the vibration absorber depicted in FIG. 1.

FIG. 3 is an side elevational view of the FIG. 2 absorber, as seen generally from the left in FIG. 2 and shown partially cut-away.

FIG. 4 is a cross sectional view taken along line 4—4 of FIG. 3.

DETAILED DESCRIPTION OF THE ILLUSTRATED EMBODIMENTS

Figure 5:
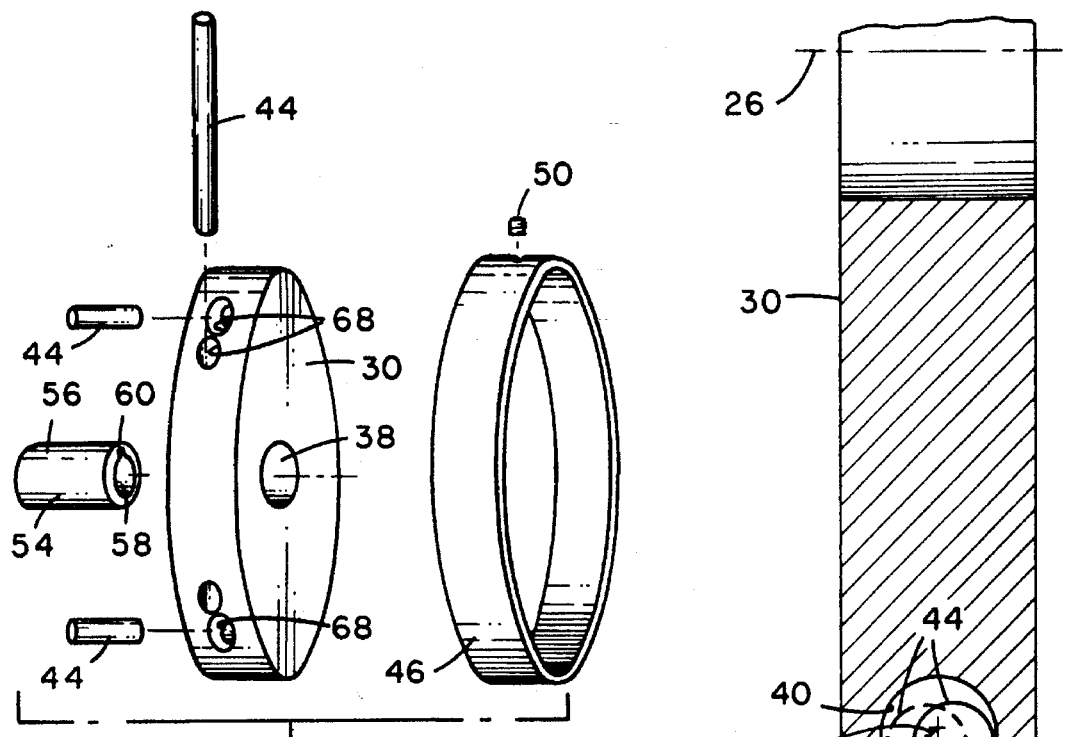
FIG. 5 is a perspective view of the FIG. 2 absorber, shown exploded.

Turning now to the drawings in greater detail, there is shown in FIG. 1 a system, generally indicated 22, for absorbing bending vibrations in a rotatable shaft 24 associated with an internal combustion engine 20. The shaft 24 is rotated about an axis of rotation 26 in response to the power pulses generated within the engine, and the bending vibrations induced in the shaft 24 are effected by the disturbances created by the alternating power and compression strokes within the engine cylinders and which act normal to the shaft 24 at locations along its length. The rotatable shaft 24 may take the form of an engine crankshaft, a flywheel, a clutch, a torque converter, or some other part which is rotatably driven by the crankshaft. Furthermore, the system 22 may be incorporated within the shaft 24 or mounted upon the shaft 24 so as to be disposed, for example, on the front or the rear of the crankshaft 24. Moreover, the engine 20 with which the system 22 is used may be either a spark-ignited or a diesel-powered engine.

Although the depicted system 22 is described herein as being used in connection with a shaft 24 exposed to bending disturbances induced by the alternating power and compression strokes within an engine 20, a system in accordance with the broader aspects of the invention can be used for absorbing bending vibrations in other rotating shafts which are exposed to cyclic bending disturbances during rotation. In the interests of the present invention, cyclic bending disturbances are the flex-inducing disturbances which act normal to a rotating shaft at locations along its length and wherein the disturbances are substantially regularly spaced throughout each revolution of the shaft. Alternatively, cyclic torsional disturbances are the torsional disturbances which tend to alternately increase and decrease the rotational speed of the shaft and wherein the disturbances are substantially regularly spaced throughout each revolution of the shaft. Accordingly, the principles of the present invention can be variously applied.

As will be apparent herein, each system embodiment described hereinafter involves cavity-defining means associated with a rotatable shaft for rotation with the shaft as the shaft rotates about its axis of rotation. The cavity-defining means includes at least one cavity which is spaced from the axis of shaft rotation and oriented so that the longitudinal axis of each cavity is substantially parallel to the axis of shaft rotation, and a rolling element is positioned within the cavity. The cavity is appropriately shaped and is arranged with respect to the axis of shaft rotation so that during rotation of the shaft, the rolling element is permitted to freely roll along at least a section of the interior wall of the cavity in an oscillatory motion, i.e., in a pendulum action, as the rotatable shaft tends to vibrate or flex normally to its axis of rotation in response to the bending disturbances to which the shaft is exposed.

It is a feature of each system embodiment that each rolling element is related to its corresponding elongated cavity and to the bending disturbances desired to be absorbed in accordance with the equation:

$$N^2 = r_w^2 r_3 / [(r_g^2 + r_w^2)(r_1 - r_w)]$$

wherein N is within about ±15% of the number of the bending disturbances per revolution, $r_w$ is the radius of the rolling element, $r_g$ is the radius of gyration of the rolling element about its longitudinal axis, $r_1$ is the radius of the cavity, and $r_3$ is the radial distance of the center of the cavity from the axis of rotation of the shaft. The foregoing equation takes into account that the natural frequency of oscillation of the rolling member inside the cavity is essentially a linear function of the rotational speed. This means that the rolling member makes a given number of oscillations for each one revolution of the crankshaft. The number of oscillations of the rolling members can be made to be equal to the number of evenly, or regularly, spaced power strokes of the engine that are causing the excitation. When this occurs, the action of the rolling members inside the cavities tend to absorb the vibrations.

With reference still to FIG. 1, the engine 20 has cylinders within which firing pulses are generated in a predetermined sequence. Moreover, for a substantially constant engine speed, the firing pulses in the engine 20 are substantially equally spaced throughout a single revolution of the shaft 24. The system 22 obtains its optimum vibration-absorbing performance while the firing pulses are substantially equally spaced as aforedescribed but absorbs an appreciable amount of bending vibrations at all engine speeds. The depicted system 22 is affixed to the shaft 24 for rotation therewith and, for this purpose, the crankshaft 24 includes a keyway 28, as best shown in FIG. 2.

With reference to FIGS. 2–4, the system 22 includes cavity-defining means 25 including a substantially plate-like wheel body 30 having a cylindrical outer periphery 32, two opposite planar faces 34, 36 and a central opening 38. Four circular recesses, or cavities 40, are defined along the periphery 32 of the body 30 so as to be symmetrically spaced about and located at an equal distance from the central opening 38. Each circular cavity 40 has cylindrical interior walls and a longitudinal axis which is oriented in a plane arranged substantially perpendicular to the axis of rotation of the body 30 (as the body 30 rotates with the crankshaft 24 about the axis 26). In addition, each cavity 40 of the depicted system 22 has a radius which is equal to the radius of every other cavity in the body 30. If desired, the body 33 may be provided with internally-threaded apertures 37 (shown in FIG. 4) with which a secondary body, e.g., a flywheel or belt pulley, can be secured to the body 30 with bolts. In such an instance, the cavities 40 would be positioned about the center of the body 30 so as not to interfere with the apertures 37, and the number of cavities 40 provided in the body 30 is preferably equal to an integer multiple of the number of apertures 37.

The system 22 also includes four cylindrical rolling elements 44 positioned within the cavities 40 wherein each element 44 is positioned within a corresponding cavity 40. In the depicted system 22, the radii of the elements 44 are equal and the radius of each element 44 is smaller than that of the cavity 40 within which the element 44 is positioned. As will be apparent herein, each element 44 is free to roll along the cylindrical sidewalls of its corresponding cavity 40 in a pendulum action during rotation of the wheel body 30 about the axis 26 and, in the depicted embodiment, has a length which is slightly shorter than the depth, i.e. length, of its cavity 40.

For purposes of maintaining the elements 44 within the cavities 40 and with reference to FIGS. 4 and 5, a pair of pins or bolts 45 are secured within the body 30 along the length of each cavity 40 so as to capture the rolling element 44 therealong, and a ring 46 is secured about the body 30 so as to cover the openings of the cavities 40. In this connection, bores 48 (which may be internally-threaded for accepting the threads of a bolt) are formed in the body 30 so as to open into the interior of a corresponding cavity 40, and a bolt 45 is positioned within each bore 48. During operation of the system 22, the bolts 45 maintain each rolling element 44 substantially centrally along the length of its cavity 40 and permit the elements 44 to freely roll along the cavity walls (in a pendulum action) in response to bending vibrations to which the shaft 24 is exposed. The ring 46 is releasably secured to the body 30 with, for example, a set screw 50 (FIG. 5). Because the ring 46 is releasably secured to the wheel body 30 with the screw 50 and the bolts 45 are releasably secured within the cavity bores 48, access can be had to the interiors of the cavities 40 by removing the ring 46 and bolts 45 from the wheel body 30.

For purposes of mounting the wheel body 30 about the crankshaft 24, the system 22 includes a collar 54 (FIG. 2 and 5) tightly positioned so as to be secured within the central opening 38 of the wheel body 30. As best shown in FIG. 5, the collar 54 includes an outer cylindrical periphery 56 sized to be received by the opening 38 in a press-fit relationship therewith and a hollow interior 58 sized to closely receive the crankshaft 24 when inserted thereupon. A groove 60 is provided along the length of the interior 58 and cooperates with the groove 28 of the crankshaft 24 to provide a keyway for accepting a key 62 (FIG. 2) inserted therein. When the wheel body 30 is positioned upon the crankshaft 24 and the key 62 is accepted by the provided keyway, the wheel body 30 is affixed to the crankshaft 24 so that as the crankshaft 24 is rotated in response to the firing pulses generated within the engine cylinders, the wheel body 30 is rotated as well.

Figure 6:
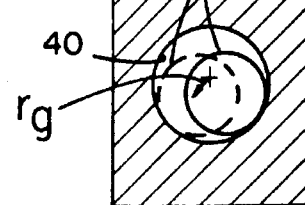
FIG. 6 is a fragment of a cross section the FIG. 2 absorber as viewed along line 6—6 of FIG. 4.

As the crankshaft 24 is rotated in response to the firing pulses generated within the engine cylinders, each cylindrical element 44 oscillates within its corresponding cavity 40 as a centrifugal pendulum between, for example, the solid and phantom positions illustrated in FIG. 6. In this connection, each power pulse generated within the engine 20 subjects the crankshaft 24 to unsteady radial loading which, in turn, generates flexing and bending moments in the crankshaft. In practice, these moments can cause high bending stress in the crankshaft so that the crankshaft bends in response to a single firing pulse. It follows that repeated firing pulses of the engine effect a cyclic bending or flexure of the crankshaft.

Figure 7:
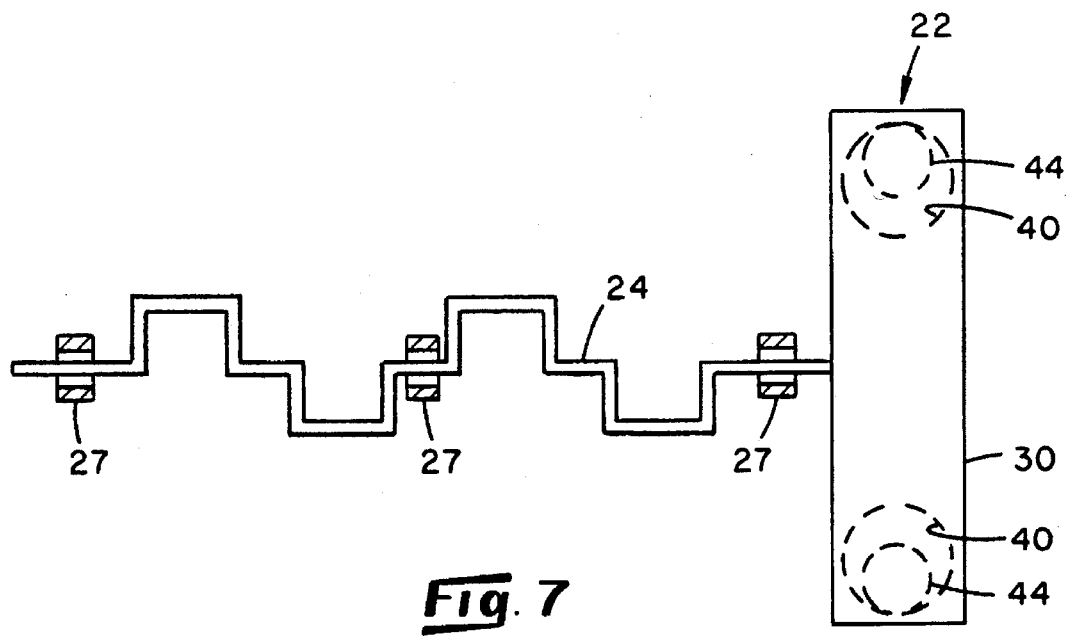
FIG. 7 is a schematic elevational view of the FIG. 2 absorber and the crankshaft upon which the absorber is mounted.
Figure 8:
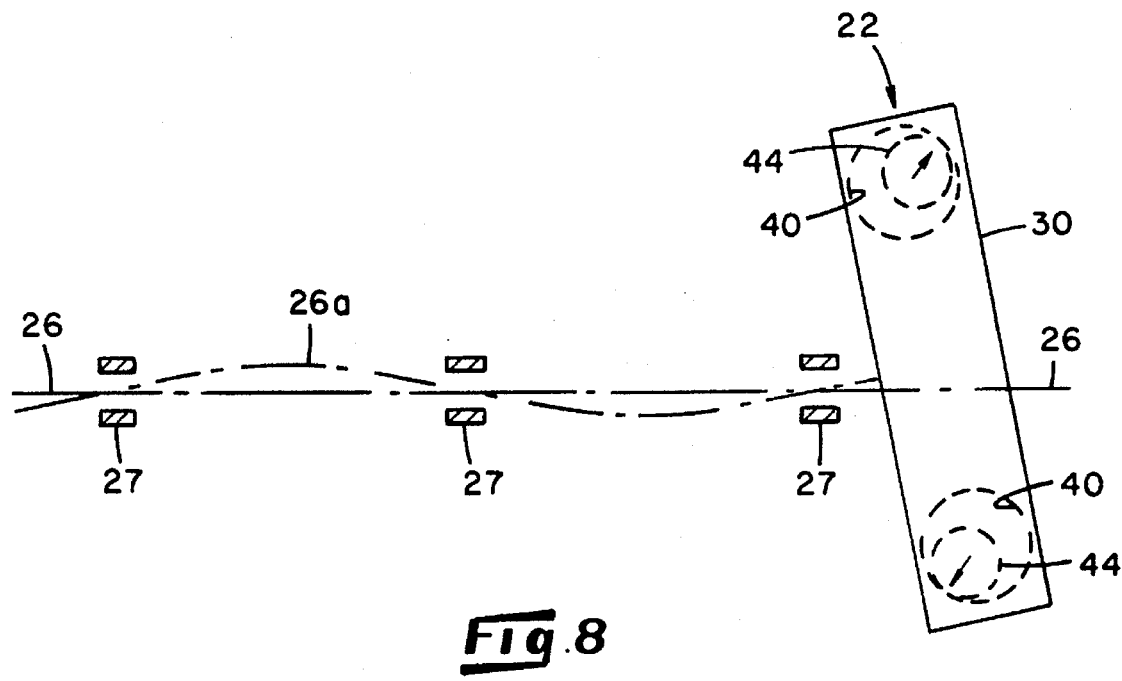
FIG. 8 is a view similar to that of FIG. 7 illustrating schematically the bending flexure of the FIG. 7 crankshaft.

In FIG. 7, there is schematically shown the absorber system 22 when attached to the end of the crankshaft 24. The crankshaft 24 is supported within its engine by means of a series of bearings 27 which are fixed in position relative to the engine block. As a consequence of the power and compression strokes of the engine 20, the crankshaft 24 may be caused to flex in the manner schematically depicted in FIG. 8 wherein the centerline, indicated 26a, of the shaft 24 flexes to one side of the true rotation axis 26 along the regions of the shaft 24 disposed between the bearings 27. As a result of the flexure induced along one region of the shaft 24, the vibration absorber 22 tends to shift relative to the true rotation axis 26, as well.

With reference again to FIG. 6, a bend of the shaft 24 in one direction, i.e. normal to the axis 26 of shaft rotation, effects a corresponding shift of each cylindrical element 44 within its cavity 40 in one direction generally parallel to the axis of shaft rotation (or toward the left or right of center of the cavity 40 as shown in FIG. 6). This leftward or rightward shift of the element 44 tends to reduce, and thereby lessen the vibratory effects of, the bend of the shaft 24. Conversely, as the shaft 24 rebounds from its bent condition (following the firing stroke), each cylindrical element 44 shifts within its cavity 40 in the direction generally parallel to the axis of shaft rotation opposite the aforesaid one direction (or toward the right or left of center of the cavity as shown in FIG. 6). This consequential rightward or leftward shift of the element 44 tends to reduce, and thereby lessen the vibratory effects of, the rebounding action of the shaft 24 and so that the elements 44 collectively tend to keep the body 30 of the depicted absorber 22 oriented in a plane disposed normal to the longitudinal axis 26 (or in a vertical plane as viewed in FIG. 7). It will be understood that as the system 22 is rotated, the centrifugal force of the rotating action tends to hold each roller element 44 against the outwardmost side of its cavity 40, while permitting the roller element 44 to roll along the interior of the cavity walls in response to the aforedescribed vibration-induced excitation.

As each cylindrical element 44 oscillates within its corresponding cavity, it moves in rolling engagement, without slip, along the interior wall of its cavity 40. Computer studies reveal that the minimum coefficient of friction required between the engaging surfaces of the element and the cavity walls in order to ensure that the element 44 rolls without slipping along the walls is relatively low. In practice, however, it is preferred that at least one of the surfaces of the element 44 or the cavity walls be appropriately coated, treated or machined to increase the surface-to-surface friction between these parts to reduce any likelihood of slip. Such surface-to-surface frictional characteristics may be obtained by providing each element 44 or the cavity walls with a textured, e.g. knurled, surface. If desired, the surfaces of the rolling element and cavity walls may be formed to simulate the mating surfaces of a spur gear and a ring gear within which the spur gear is positioned. Lubrication between the engaging surfaces is neither desired nor necessary. To reduce friction and noise which maybe created by contact between the ends of the elements 44 and the ends of the cavities 40, a low friction material, such as brass, Teflon or urethane may be placed over the ends of the elements 44 or the surfaces of the bolts 45.

In accordance with the equation provided above and in order for the system 22 to be as effective as possible, the ratio of the natural frequency of any element 44 in a cavity 40 to the engine speed should be equal to the number of bending disturbances, i.e., disturbance cycles, per revolution of the shaft desired to be absorbed. With regard to the depicted system 22, the number of bending disturbances corresponds to the number of firing pulses of the engine per revolution of the crankshaft 24. For example, for an eight cylinder, four cycle engine, there are four firing pulses per revolution. This means that the natural frequency of an element 44 within its cavity 40 for this example is equal to four times the rotational speed of the engine.

In practice, it may not be possible to design the components of the system so that the right side of the equation provided above equals the exact number of bending disturbances per revolution of the shaft, but it is believed that acceptable performance of the system is achieved if the right side of the equation is within about ±15% of the number of bending disturbances per revolution of the shaft. Hence, the term N on the left side of the equation includes a permissible range of values above and below the exact number of the bending disturbances per revolution of the shaft being addressed by the system design. For improved absorption of the bending vibrations, the right side of the equation is within about ±5% of the number of bending disturbances per revolution of the shaft.

Computer studies have confirmed that because of nonlinearities and other effects, better performance is achieved when the right side of the above-provided equation is slightly greater than the ideal value, i.e., the number of bending disturbances per revolution being addressed, than when the right side of the equation is slightly less than the ideal value. Thus, if, in practice, the system components cannot be designed so that the right side of the equation is exactly equal to the number of bending disturbances per revolution of the shaft being addressed, it is preferable that the system components be designed so that the right side of the equation be slightly greater than (as opposed to less than) the number of bending vibrations per revolution of the shaft.

To increase the effectiveness of the absorber system 22 for controlling and reducing bending vibrations, the outer diameter and the thickness of the wheel body 30 should be as large as possible, or as large as is practical, for a given application. The cylindrical elements 40 should preferably be constructed of a relatively dense material, such as steel. The effectiveness of the absorber system 22 can be a strong function of the outer diameter of the wheel body. For each particular outer diameter of the body, there is an optimum number of cavities, cavity radius ($r_1$), and the radius location of the cavity ($r_3$). In addition, it is also preferable to locate the cavities as close together as is consistent with the strength capability of the wheel body.

For illustrative purposes, exemplary dimensions of the system 22 wherein N=4 and in accordance with the aforementioned equation are provided here as follows. In this example, the rolling element is a right circular homogeneous solid cylinder. The outer diameter of the wheel body 30 is about 6.125 inches, the radius ($r_w$) of each element 44 is about 0.605 inches, the radius of gyration ($r_g$) of each element 44 is $r_w/(2)^{1/2}$ or 0.428 inches, the radius ($r_1$) of each cavity 40 is about 0.688 inches, and the radial distance ($r_3$) of the center of each cavity 40 from the rotation axis 26 is about 1.980 inches.

The system 22 is advantageous in several respects. In the first instance, the pendulum action of the rolling elements 44 will tend to keep the orientation of the cylinder perpendicular to the axis, or centerline, of shaft rotation. This tendency will stiffen the crankshaft, reduce the bending stresses, absorb bending vibrations, and reduce noise of the shaft. Of course, by better controlling bending vibration, the likelihood of a crankshaft failure due to such vibration is reduced. Secondly, the system 22 provides vibration absorption over the entire speed range of the engine. More specifically, since the natural frequency of the rolling elements is approximately a linear function of engine speed, the system 22 is effective at all engine speeds. Thirdly and in contrast to vibration dampers which control damping by energy dissipation, the vibration absorbing system 22 does not operate by dissipating energy.

In addition, the useful life of the system 22 is believed to be very long. With no sliding contact between the cylindrical elements and the cavity walls, little wear of the system components is expected. Furthermore and in contrast to some vibration absorbers and dampers of the prior art, there is no fluid to leak or elastomer to fail.

Still further, the uncomplicated design of the system 22 enables it to be constructed with relatively small cost, which cost is believed to be clearly less than that of some classes of dampers constructed for damping torsional vibrations.

Figure 9:
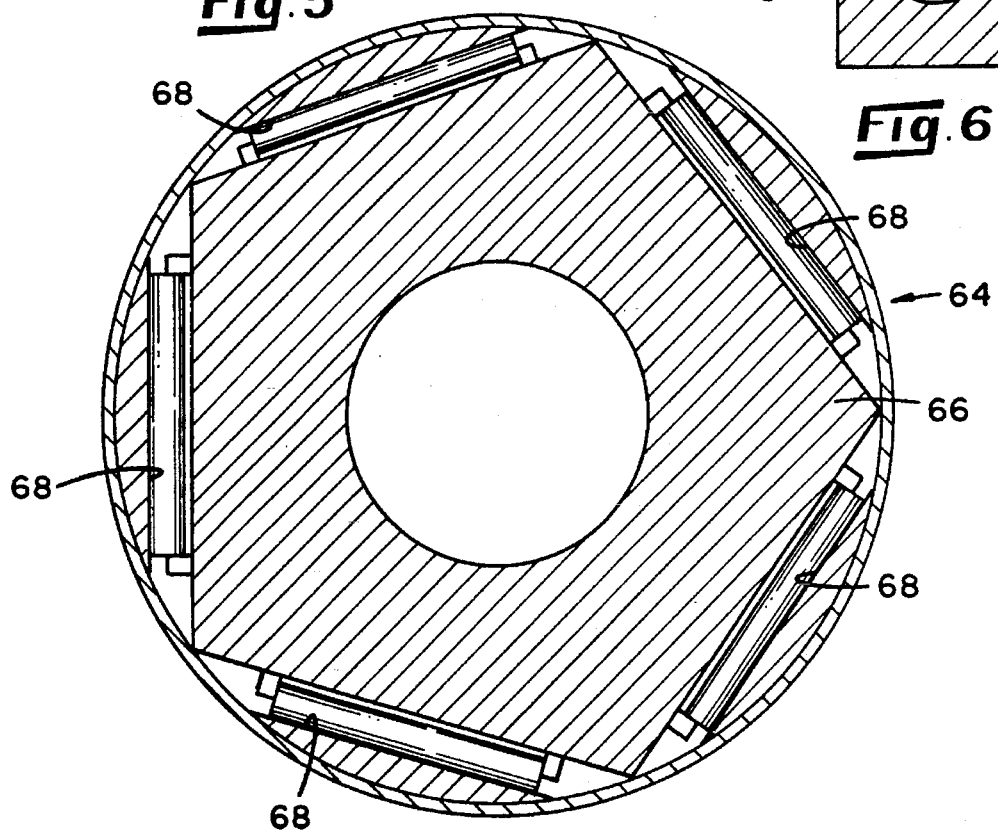
FIG. 9 is a radial cross sectional view of another embodiment of an absorber incorporating features of the present invention.

It will be understood that numerous modifications and substitutions can be had to the system embodiment 22 without departing from the spirit of the invention. For example, although the system 22 has been shown and described as including four cavities 40 within which cylindrical elements 44 are positioned, a system in accordance with the broader aspects of the present invention may possess an alternative number of cavities. For example, there is shown in FIG. 9 an alternative system 64 having a wheel body 66 within which five cavities 68 are defined.

Figure 10:
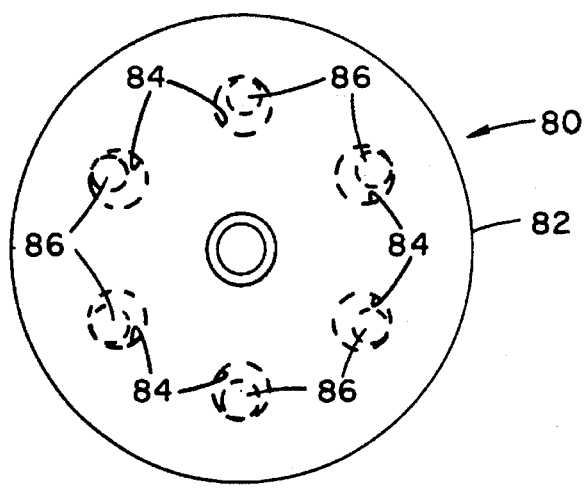
FIG. 10 is a front elevational view of still another embodiment of an absorber incorporating features of the present invention.
Figure 11:
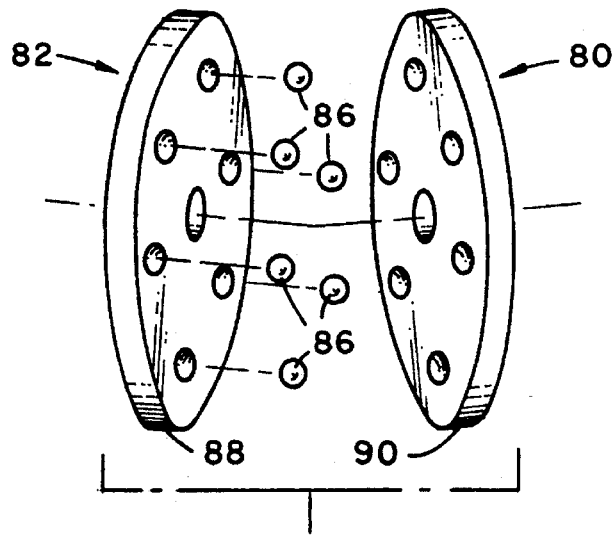
FIG. 11 is a perspective view of the FIG. 10 absorber embodiment, shown exploded.

Still further, although the aforedescribed system embodiments have been shown and described as cavities and round roller elements of cylindrical configuration, the cavities and roller elements may take an alternative form. For example, there is shown in FIGS. 10 and 11 a system embodiment 80 including a wheel body 82 within which are defined six cavities 84 of spherical configuration and wherein a spherical roller element 86 is positioned within each cavity 84. As best shown in FIG. 11, the wheel body 82 is comprised of two plate-like pieces 88, 90 having a side face within which six recesses of hemispherical configuration are formed. When the pieces 88, 90 are subsequently joined together, as with bolts, so that the recess-providing faces of the pieces 88, 90 oppose one another, each recess formed in one piece 88 or 90 mates, or cooperates, with a corresponding (matching) recess formed in the other piece 90 or 88 to collectively provide a spherical cavity 84.

Since each spherical roller element 86 is free to roll along the walls of its cavity 84 in any of a number of alternative planes, the system 80 is advantageous in that it is capable of absorbing torsional vibrations, as well as bending vibrations. Torsional vibrations may be caused, for example, by the alternating power and compression strokes of an engine which effect, respectively, a small increase in engine, i.e. crankshaft, speed and a small decrease in engine, i.e. crankshaft, speed. During operation of the system 80 and in response to the power stroke-induced increase in engine speed, each roller element 86 shifts within its cavity 84 in the rotational direction of the wheel body 82 opposite the direction in which the wheel body 82 is rotated. This rearward shift of the element 86 tends to reduce, and thereby lessen the torsional vibratory effects of this small increase in engine speed. Conversely and in response to the compression-stroke induced decrease in engine speed, each roller element 86 shifts within its cavity 84 in the rotational direction corresponding to the rotational direction of the wheel body 82 about the rotational axis. For a more detailed description concerning the absorption of torsional vibration in a shaft by cavity-mounted roller elements, reference can be had to U.S. Pat. No. 5,295,411 having the same inventor as the instant application, the disclosure of which is incorporated herein by reference.

As far as the design of the components of the system 80 are concerned, the above-provided equation applies. More specifically, when the system 80 is desired to absorb bending vibrations induced in a shaft, each spherical element is related to its corresponding elongated cavity and to the bending disturbances desired to be absorbed in accordance with the equation:

$$N^2 = r_w^2 r_3 / [(r_g^2 + r_w^2)(r_1 - r_w)]$$

wherein N is within about ±15% of the number of bending disturbances per revolution, $r_w$ is the radius of the spherical element, $r_g$ is the radius of gyration of the spherical element about its mass center, $r_1$ is the radius of the spherical cavity, and $r_3$ is the radial distance of the center of the spherical cavity from the axis of rotation of the shaft. However, in the event that the system 80 is desired to absorb torsional vibrations, N of the above equation must equal ±15% of the number of torsional disturbances per revolution of the shaft. It will be understood, however, that in many applications, the number of bending disturbances and the number of torsional disturbances will be equal to one another.

Yet still further, although the aforedescribed system embodiments have been shown and described as including cavities of equal size and including roller elements of equal size, a system in accordance with the broader aspects of the invention may include differently-sized cavities and differently-sized elements. For example, a system can be designed to absorb bending vibration in a shaft which is exposed to cyclic bending disturbances of one frequency, e.g., four disturbances per revolution of a shaft, and other cyclic bending disturbances of another frequency, e.g. five disturbances per revolution of the shaft. To this end, the system can include a cavity-defining body within which is defined a first set of cavities of one diameter and one radial distance from the shaft axis and an additional set of cavities of another diameter and another radial distance from the shaft axis. The roller elements which are positioned within the first set of cavities are related to the cavities in accordance with the equation provided above so that the right side of the equation is about equal to the number of bending disturbances of one frequency, e.g., four, and elements which are positioned within the additional set of cavities are related thereto in accordance with the equation so that the right side of the equation is about equal to the number of bending disturbances of the other frequency, e.g., five.

It follows from the foregoing description that the number of disturbances (bending or torsional) addressed by each element and its cavity is a predetermined number, e.g., four or five, of disturbances per revolution of a shaft, rather than the cumulative total number, e.g., nine, of disturbances per revolution of the shaft.

Figure 12:
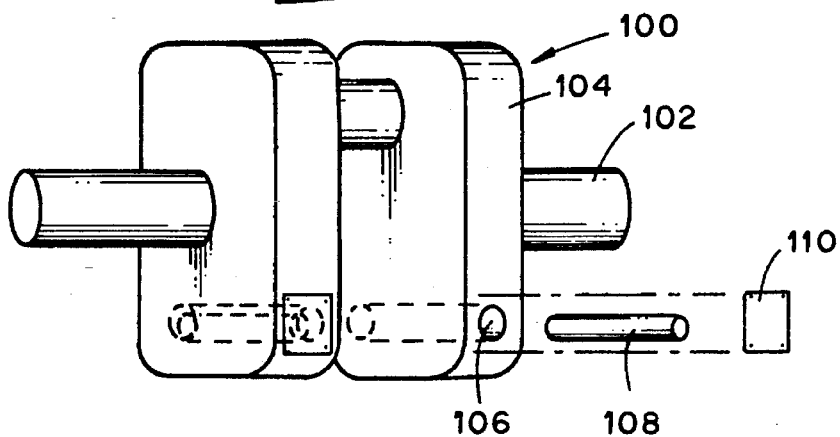
FIG. 12 is a fragmentary perspective view of a rotatable shaft and an absorber system utilized with the shaft, shown exploded.

Further still, although the aforedescribed system embodiments have been shown and described as including wheel bodies of cylindrical configuration, the system cavity-defining body may take an alternative form. For example, there is shown in FIG. 12 a system embodiment 100 which has been integrated within the body of an engine crankshaft 102. Within the system 100, the cavity-defining means is provided by a radial section, indicated 104, of the crankshaft 102, and the radial section 104 defines a circular recess 106 which opens out of one side edge of the section 104 so that the centerline of the recess 106 is arranged in a plane oriented substantially parallel to the axis of shaft rotation. A cylindrical element 108 is positioned within the recess and captured between the bottom of the recess 106 and a plate 110 affixed to one side of the section 104 so as to cover the opening of the recess 106. The element 108 is free to roll along the walls of its cavity, or recess 106, in response to the bending disturbances to which the crankshaft 102 is exposed.

Yet further still, the arrangement, number, and size of the system cavities do not have to be symmetrical about the rotation axis of the system body. Moreover, the location of the cavities do not need to be totally symmetrical nor do all the cavities have to be located at the same radial distance from the center of rotation. Each cavity and corresponding roller element merely needs to satisfy the equation provided above as the cavity and element address a predetermined number of bending or torsional disturbances through a single revolution of a shaft.

Further still, although the above-described systems have been shown and described as being attached to the end of a shaft, e.g. crankshaft, the systems may be attached to or integrated within the shaft at an alternative, i.e. any, location therealong. It is believed, however, that the effectiveness of a system intended to absorb bending vibrations is enhanced when positioned at a node point along the shaft, i.e. at a point where the slope of the shaft is a maximum or where the torsional deflection is a maximum. Still further, the rolling elements of a system in accordance with the broader aspects of the present invention may be oval in shape, rather than cylindrical or spherical in form. In the case of an oval rolling element, the radius ($r_w$) of the element for purposes of the above-provided equation is taken to be the radius of the element as measured between the center of the element and the point along the surface of the cavity at which the element contacts the surface.

Accordingly, the aforedescribed embodiments are intended for the purpose of illustration and not as limitation.

I claim:

1. A system for absorbing bending vibrations in a shaft which is drivingly rotated about an axis and wherein the shaft is exposed to disturbances which tend to cyclically bend the shaft during rotation thereof, the system comprising:

means defining at least one elongated cavity having a longitudinal axis, a radius, a center and an interior wall for rotating with a rotating shaft as the shaft rotates about its axis of shaft rotation, the at least one elongated cavity being substantially linear in form as a path is traced along its longitudinal axis and arranged in such a relation to the shaft so that the longitudinal axis of the at least one elongated cavity is arranged in a plane oriented substantially perpendicular to the axis of shaft rotation;

a rolling element having a radius and being positioned within the at least one elongated cavity so as to be free to roll along the interior wall of the at least one elongated cavity in a pendulum action upon exposure of the shaft to bending disturbances during rotation; and wherein the rolling element has a longitudinal axis and is shape in such a relation to the at least one elongated cavity so that the movement of the rolling element relative to the at least one elongated cavity is substantially confined to rolling movement along the interior wall of the at least one elongated cavity about the longitudinal axis of the at least one elongated cavity and is related to the at least one elongated cavity and to the bending disturbances desired to be absorbed by the system in accordance with the equation:

$$N^2 = r_w^2 r_3 / [(r_g^2 + r_w^2)(r_1 - r_w)]$$

wherein N is within about ±15% of the number of bending disturbances per revolution of the shaft, $r_w$ is the radius of the rolling element about its longitudinal axis, $r_g$ is the radius of gyration of the rolling element about its said longitudinal axis and through its mass center, $r_1$ is the radius of the at least one elongated cavity, and $r_3$ is the radial distance of the center of the at least one elongated cavity from the axis of shaft rotation.

2. The system as defined in claim 1 wherein N is within at least about ±5% of the number of bending disturbances per revolution of the shaft desired to be absorbed.

3. The system as defined in claim 1 wherein N is at least as great as the number of bending disturbances per revolution of the shaft desired to be absorbed.

4. The system as defined in claim 1 wherein there are at least two elongated cavities defined by the cavity-defining means, a rolling element is positioned within each of the at least two elongated cavities as aforesaid, and each rolling element is related to the at least one elongated cavity within which the rolling element is positioned and to the bending disturbances desired to be absorbed by the system in accordance with the aforesaid equation.

5. The system as defined in claim 4 wherein the at least two elongated cavities are symmetrically spaced about the axis of shaft rotation.

6. The system as defined in claim 1 wherein the cavity-defining means is provided by a body which is securable to the shaft with which the system is utilized.

7. The system as defined in claim 6 wherein the body is a first body and includes a plurality of apertures with which a second body is securable to the first body.

8. The system as defined in claim 7 wherein the number of the at least two cavities is an integer multiple of the number of said plurality of apertures.

9. The system as defined in claim 1 wherein the surface-to-surface friction between the periphery of the rolling element and the interior wall of the at least one elongated cavity is relatively high to reduce any likelihood of slip therebetween as the rolling element rolls along the interior wall during operation of the system.

10. The system as defined in claim 1 wherein the shaft is driven about the axis of shaft rotation in response to power pulses generated within the cylinders of an internal combustion engine and wherein the number of bending disturbances desired to be absorbed corresponds with the number of power pulses per revolution of the engine.

11. A system for absorbing bending vibration in a shaft which is drivingly rotated about an axis and wherein the shaft is exposed to bending disturbances during rotation and wherein the disturbances are substantially regularly spaced throughout each revolution of the shaft, the system comprising:

means defining at least one cavity of circular cross section and having walls, a center and a radius for rotating with a rotating shaft as the shaft rotates about its axis of shaft rotation, the at least one cavity having a longitudinal axis and being substantially linear in form as a path is traced along its longitudinal axis and arranged in such a relation to the shaft so that a circular cross section can be taken through the at least one cavity wherein the circular cross section is arranged in a plane containing the axis of shaft rotation;

a round rolling element having a radius and being positioned within the at least one cavity so as to be free to roll along the walls of the at least one cavity in a pendulum action in response to the bending disturbances to which the shaft is exposed; and wherein the round rolling element is shaped relative to the at least one elongated cavity so that the movement of the rolling element relative to the at least one cavity is substantially confined to rolling movement along the at least one cavity in a pendulum action about the longitudinal axis of the cavity and is related to the at least one cavity and to the bending disturbances desired to be absorbed by the system in accordance with the equation:

$$N^2 = r_w^2 r_3 / [(r_g^2 + r_w^2)(r_1 - r_w)]$$

wherein N is within about ±15% of the number of bending disturbances per revolution of the shaft, $r_w$ is the radius of the round rolling element as measured between its center and its point of contact with the walls of the at least one cavity, $r_g$ is the radius of gyration of the round rolling element about its mass center, $r_1$ is the radius of the at least one cavity, and $r_3$ is the radial distance of the center of the at least one cavity from the axis of shaft rotation.

12. The system as defined in claim 11 wherein the at least one cavity has spherical walls and the round rolling element is spherical in shape.

13. A system for absorbing vibrations in a shaft which is drivingly rotated about an axis and wherein the shaft is exposed to torsional and bending disturbances during rotation and wherein each of the torsional and bending disturbances are substantially regularly spaced throughout each revolution of the shaft, the system comprising:

means defining at least one cavity of circular cross section and having walls, a radius and a center for rotating with a rotating shaft as the shaft rotates about its axis of shaft rotation, the at least one cavity being arranged in such a relation to the shaft so that one circular cross section can be taken through the at least one cavity which is arranged in a plane containing the axis of shaft rotation and another circular cross section can be taken through the at least one cavity in a plane which is oriented substantially perpendicular to the axis of shaft rotation;

a round rolling element having a radius and being positioned within the at least one cavity so as to be free to roll along the walls of the at least one cavity in a pendulum action in response to the torsional and bending disturbances to which the shaft is exposed; and wherein the round rolling element is related to the at least one cavity and to either the torsional disturbances or the bending disturbances desired to be absorbed by the system in accordance with the equation:

$$N^2 = r_w^2 r_3 / [(r_g^2 + r_w^2)(r_1 - r_w)]$$

wherein N is within about ±15% of the number of torsional or bending disturbances per revolution of the shaft, $r_w$ is the radius of the round rolling element as measured between its center and its point of contact with the walls of the at least one cavity, $r_g$ is the radius of gyration of the round rolling element about its mass center, $r_1$ is the radius of the at least one cavity, and $r_3$ is the radial distance of the center of the at least one cavity from the axis of shaft rotation.

14. The system as defined in claim 13 wherein the at least one cavity has spherical walls and the round rolling element is spherical in shape.

15. The system as defined in claim 13 wherein N is within at least about ±5% of the number of torsional or bending disturbances per revolution of the shaft desired to be absorbed.

16. The system as defined in claim 13 wherein N is at least as great as the number of torsional or bending disturbances per revolution of the shaft.

17. The system as defined in claim 13 wherein the cavity-defining means defines at least two cavities of circular cross section arranged about the shaft as aforesaid, a rolling element is positioned within each of the at least two cavities so as to be free to roll along the walls of the cavity within which the rolling element is positioned as aforesaid, and each rolling element is related to the cavity within which the rolling element is positioned and to the torsional or bending disturbances desired to be absorbed by the system in accordance with the aforesaid equation.

18. The system as defined in claim 17 wherein the at least two cavities are symmetrically spaced about the axis of shaft rotation.

19. The system as defined in claim 13 wherein the cavity-defining means is provided by a body which is securable to the shaft with which the system is utilized.

20. The system as defined in claim 13 wherein the shaft is driven about the axis of shaft rotation in response to power pulses generated within the cylinders of an internal combustion engine and wherein the number of torsional or bending disturbances desired to be absorbed corresponds with the number of power pulses per revolution of the engine.

21. A system for absorbing bending and torsional vibration in a shaft which is drivingly rotated about an axis and wherein the shaft is exposed to disturbances which tend to cyclically bend the shaft during rotation thereof and which tend to cyclically increase and decrease the rotational speed of the shaft, the system comprising:

means defining at least one spherical cavity having interior walls for rotating with a rotating shaft as the shaft rotates about its axis of shaft rotation;

a spherical rolling element having a radius and positioned within the at least one spherical cavity so as to be free to roll along the interior walls of the at least one spherical cavity in a pendulum action upon exposure of the shaft to bending or torsional disturbances during rotation; and wherein the spherical rolling element is related to the at least one spherical cavity and to the bending or torsional disturbances desired to be absorbed by the system in accordance with the equation:

$$N^2 = r_w^2 r_3 / [(r_g^2 + r_w^2)(r_1 - r_w)]$$

wherein N is within about ±15% of the number of bending or torsional disturbances per revolution of the shaft, $r_w$ is the radius of the spherical rolling element, $r_g$ is the radius of gyration of the spherical rolling element about its mass center, $r_1$ is the radius of the at least one spherical cavity, and $r_3$ is the radial distance of the center of the at least one spherical cavity from the axis of shaft rotation.

22. The system as defined in claim 21 wherein N is within at least about ±5% of the number of bending or torsional disturbances per revolution of the shaft desired to be absorbed.

* * * * *